US012129449B2

(12) United States Patent
Silvernail et al.

(10) Patent No.: US 12,129,449 B2
(45) Date of Patent: Oct. 29, 2024

(54) COLOR CHANGING DETERGENT COMPOSITIONS AND METHODS OF USE

(71) Applicant: ECOLAB USA INC., Saint Paul, MN (US)

(72) Inventors: Carter M. Silvernail, Saint Paul, MN (US); Kerrie E. Walters, Saint Paul, MN (US)

(73) Assignee: ECOLAB USA INC., Saint Paul, MN (US)

(*) Notice: Subject to any disclaimer, the term of this patent is extended or adjusted under 35 U.S.C. 154(b) by 241 days.

(21) Appl. No.: 16/948,541

(22) Filed: Sep. 23, 2020

(65) Prior Publication Data

US 2021/0087495 A1 Mar. 25, 2021

Related U.S. Application Data

(60) Provisional application No. 62/904,033, filed on Sep. 23, 2019.

(51) Int. Cl.

*C11D 1/72* (2006.01)
*C11D 1/722* (2006.01)
(Continued)

(52) U.S. Cl.

CPC .................. *C11D 3/10* (2013.01); *C11D 1/72* (2013.01); *C11D 1/722* (2013.01); *C11D 3/0047* (2013.01);
(Continued)

(58) Field of Classification Search

CPC .. C11D 1/72; C11D 1/722; C11D 3/04; C11D 3/10; C11D 3/40; C11D 3/3757; C11D 3/3765
(Continued)

(56) References Cited

U.S. PATENT DOCUMENTS

| | | |
|---|---|---|
| 3,926,830 A | 12/1975 | Horiguchi et al. |
| 5,064,635 A | 11/1991 | Casey |

(Continued)

FOREIGN PATENT DOCUMENTS

| | | |
|---|---|---|
| DE | 202010005443 U1 | 9/2010 |
| EP | 1097192 B1 | 6/2003 |

(Continued)

OTHER PUBLICATIONS

Mohr et al., "Tailoring colour changes of optical sensor materials by combining indicator and inert dyes and their use in sensor layers, textiles and non-wovens", Sensors and Actuators B: Chemical, vol. 206, pp. 788-793, 2015.

(Continued)

*Primary Examiner* — Gregory R Delcotto

(74) *Attorney, Agent, or Firm* — McKee, Voorhees & Sease, PLC

(57) ABSTRACT

Color changing alkaline warewash detergents containing a pH sensitive indicator are disclosed. In particular, the warewash detergents can change color in alkaline environments. As the soil level increases or detergent decreases, a color change indicates that the warewash machine needs to be drained and refilled. Methods of employing the color changing alkaline detergent compositions are also disclosed.

17 Claims, 2 Drawing Sheets
(2 of 2 Drawing Sheet(s) Filed in Color)

(51) Int. Cl.

| | |
|---|---|
| ***C11D 3/00*** | (2006.01) |
| ***C11D 3/04*** | (2006.01) |
| ***C11D 3/08*** | (2006.01) |
| ***C11D 3/10*** | (2006.01) |
| ***C11D 3/33*** | (2006.01) |
| ***C11D 3/36*** | (2006.01) |
| ***C11D 3/37*** | (2006.01) |
| ***C11D 3/40*** | (2006.01) |
| ***C11D 17/00*** | (2006.01) |
| ***C11D 17/06*** | (2006.01) |

(52) U.S. Cl.

CPC ................ *C11D 3/04* (2013.01); *C11D 3/044* (2013.01); *C11D 3/08* (2013.01); *C11D 3/33* (2013.01); *C11D 3/361* (2013.01); *C11D 3/3757* (2013.01); *C11D 3/3761* (2013.01); *C11D 3/3765* (2013.01); *C11D 3/40* (2013.01); *C11D 17/0008* (2013.01); *C11D 17/06* (2013.01); *C11D 2111/18* (2024.01)

(58) Field of Classification Search

USPC ........ 510/229, 235, 421, 477, 488, 499, 509

See application file for complete search history.

(56) References Cited

U.S. PATENT DOCUMENTS

| | | | | |
|---|---|---|---|---|
| 6,274,538 | B1 | 8/2001 | Addison | |
| 6,358,911 | B1 | 3/2002 | Metzger-Groom | |
| 7,169,740 | B2 | 1/2007 | Sommerville-Robers et al. | |
| 7,648,953 | B2 * | 1/2010 | Bastigkeit ................ | C11D 1/83 510/357 |
| 8,067,350 | B2 * | 11/2011 | Wenzel .................. | A61Q 19/10 510/491 |
| 2003/0059483 | A1 | 3/2003 | Sowle et al. | |
| 2004/0063601 | A1 | 4/2004 | Denome et al. | |
| 2004/0067861 | A1 | 4/2004 | Denome et al. | |
| 2006/0222675 | A1 | 10/2006 | Sabnis et al. | |
| 2008/0223413 | A1 * | 9/2008 | Radford ................. | C11D 17/08 134/34 |
| 2008/0242569 | A1 | 10/2008 | Carter et al. | |
| 2010/0093595 | A1 * | 4/2010 | Holzhauer ......... | C11D 17/0017 510/342 |
| 2010/0240749 | A9 * | 9/2010 | Spengler ................ | A61K 31/79 514/536 |
| 2013/0029894 | A1 | 1/2013 | Bettiol et al. | |
| 2015/0210969 | A1 | 7/2015 | Brandt-Sanz et al. | |
| 2015/0307814 | A1 | 10/2015 | Campbell et al. | |
| 2017/0321162 | A1 | 11/2017 | Lant et al. | |

FOREIGN PATENT DOCUMENTS

| | | | | |
|---|---|---|---|---|
| EP | 1903099 | A1 | 3/2008 | |
| EP | 2196531 | A1 | 6/2010 | |
| EP | 2987848 | A1 | 2/2016 | |
| GB | 1424714 | | 2/1976 | |
| JP | S4214636 | B1 | 8/1967 | |
| JP | S5120905 | A | 2/1976 | |
| JP | 2006296470 | A | 11/2006 | |
| WO | 0004115 | A2 | 1/2000 | |
| WO | 2007080105 | A1 | 7/2007 | |
| WO | 2008074635 | A1 | 6/2008 | |
| WO | WO-2011006658 | A1 * | 1/2011 | ............... A61K 8/11 |
| WO | WO-2019115172 | A1 * | 6/2019 | |
| WO | WO-2019126162 | A1 * | 6/2019 | ............. A61K 8/361 |

OTHER PUBLICATIONS

International Searching Authority in connection with PCT/US2020/052193 filed Sep. 23, 2020, “The International Search Report and the Written Opinion of the International Searching Authority, or the Declaration”, 12 pages, mailed Dec. 11, 2020.

* cited by examiner

COLOR CHANGING DETERGENT COMPOSITIONS AND METHODS OF USE

CROSS-REFERENCE TO RELATED APPLICATION

This application claims priority under 35 U.S.C. § 119 to U.S. Provisional Application Ser. No. 62/904,033, filed on Sep. 23, 2019, which is herein incorporated by reference in its entirety including without limitation, the specification, claims, and abstract, as well as any figures, tables, or examples thereof.

TECHNICAL FIELD

Embodiments herein relate generally to the field of warewash detergents and methods of employing the same. In particular, the detergent compositions disclosed herein can change color in alkaline environments. Methods of employing the color changing detergent compositions are also disclosed.

BACKGROUND

Current solid warewash products are dispensed from a dispenser into the warewash machine. Although the concentration of detergent is controlled by inexpensive methods such as conductivity probes, the presence of food soil may interfere with the conductivity reading resulting in decreasing detergent concentration as a function of increasing soil load. Thus, there is a need for an alternative technology that can indicate to the customer when the detergent concentration is below the recommended range and/or the soil concentration in the dish machine sump is high.

Accordingly, it is an objective of the claimed detergent compositions to address at least one of the above problems and/or to offer improved or alternative detergent compositions with application benefits.

A further object of the detergent composition disclosed herein is to provide detergent compositions containing a pH sensitive color changing indicator dye.

A further object of the detergent compositions disclosed herein is to provide a method and process for employing the color changing detergent compositions disclosed herein.

Other objects, advantages and features of the detergent compositions disclosed herein and use thereof will become apparent from the following specification taken in conjunction with the accompanying drawings.

SUMMARY

The present disclosure meets the needs above by providing color changing alkaline detergent compositions. The detergent compositions change color as the concentration falls below the recommended range and/or the soil concentration is too high. The use of the color changing detergent compositions disclosed herein can provide an at-a-glance signal that the concentration of the detergent is sufficient or insufficient to achieve efficacious cleaning.

In one aspect, provided herein are color changing alkaline detergent compositions comprising an alkalinity source and a pH sensitive dye, wherein the pH sensitive dye exhibits a color change between a pH of approximately 10 or less. In some embodiments, the alkalinity source comprises an alkali metal carbonate, alkali metal hydroxide, alkali metal metasilicate and/or alkali metal silicate. In some embodiments, the pH sensitive dye is an azo dye. Preferably, the pH sensitive dye is Alizarin Yellow R. In some embodiments, the detergent compositions provided herein comprise one or more additional functional ingredients including nonionic surfactants, water conditioning polymers, aminocarboxylates, phosphonates, anti-redeposition agents, and/or stabilizing agents. Preferably, a use solution of the detergent compositions disclosed herein have a pH of above 10. Preferably, the use solution of the composition comprises from about 100 to about 2000 ppm of the alkalinity source and from about 1 to about 500 ppm of the pH sensitive dye.

In another aspect, provided herein are methods of detecting the concentration of a cleaning composition comprising contacting a surface or article in need of cleaning with the color changing alkaline detergent compositions disclosed herein and determining whether the composition has a concentration efficacious for cleaning by observing whether the composition exhibits a color change. In some embodiments, the methods comprise generating a use solution of detergent composition. Preferably, the use solution is generated within a warewashing machine. In some embodiments, the color change indicates that a solution pH is outside of the efficacious range for optimum cleaning. In certain embodiments the change is from a one color to a second color, at a pH of approximately 10 or less, indicating that new detergent needs added.

In yet another aspect, provided herein are methods of cleaning ware comprising generating a use solution by diluting the color changing alkaline detergent compositions disclosed herein and applying the use solution to a ware surface. Preferably, the use solution is generated within a ware washing machine. In some embodiments, the methods further comprise draining the warewash machine when a color change is observed. In some embodiments, the color change occurs when the used solution achieves a pH of less than 10.1 or less than 10, and the color change indicates the warewash machine needs to be drained and the use solution replaced.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE FIGURES

The patent or application file contains at least one drawing executed in color. Copies of this patent or patent application publication with color drawing(s) will be provided by the Office upon request and payment of the necessary fee.

Figure 1:
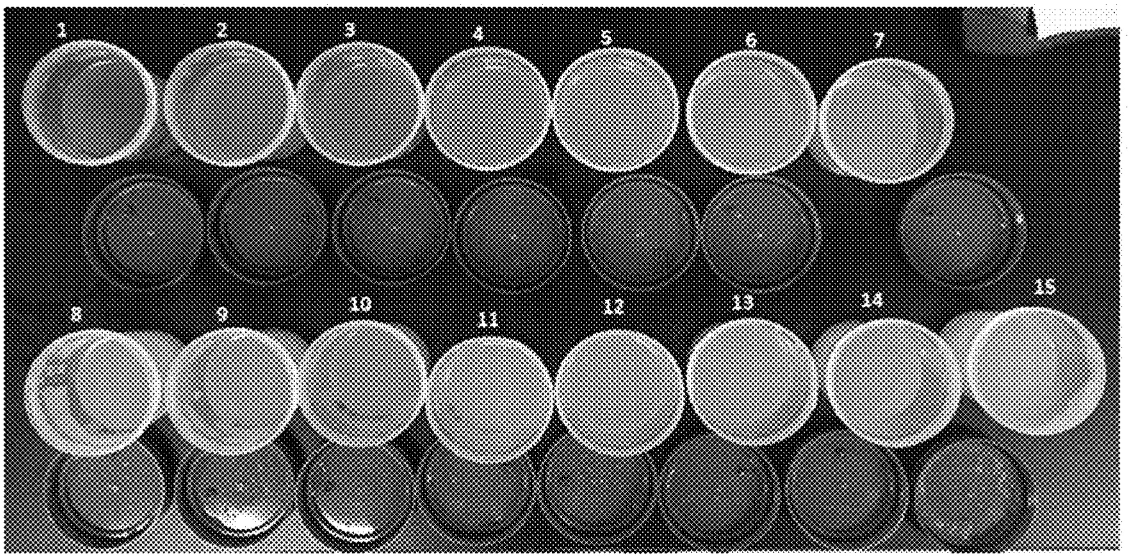
FIG. 1 shows the observed color change between wash cycles 3 and 45 showing a red to yellow color change between pH 10.7-less than 10.1.

Various embodiments of the detergent compositions and their methods of use will be described in detail with reference to the figures. Reference to various embodiments does not limit the scope of the inventions. Figures represented herein are not limitations to the various embodiments and are presented for exemplary illustration of the detergent compositions disclosed herein.

DETAILED DESCRIPTION

The embodiments are not limited to particular alkaline detergent compositions, which can vary and are understood by skilled artisans, based on the disclosure of the present invention. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾. This applies regardless of the breadth of the range.

Definitions

So that the detergent compositions disclosed herein and use thereof may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "cleaning" refers to a method used to facilitate or aid in soil removal.

As used herein, the term "substantially free", "free", "substantially free of" or "free of" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

An "antiredeposition agent" refers to a compound that helps keep suspended in water instead of redepositing onto the object being cleaned. Antiredeposition agents are useful in the present invention to assist in reducing redepositing of the removed soil onto the surface being cleaned.

The term "threshold agent" refers to a compound that inhibits crystallization of water hardness ions from solution, but that need not form a specific complex with the water hardness ion. Threshold agents suitable for various cleaning applications include but are not limited to a polycarboxylic acid polymers, polyacrylate, a polymethacrylate, an olefin/maleic copolymer, and the like.

As used herein, the term "polymer" generally includes, but is not limited to, homopolymers, copolymers, such as for example, block, graft, random and alternating copolymers, terpolymers, and higher "x"mers, further including their derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule.

As used herein, the term "ware" generally refers to items such as eating and cooking utensils, dishes, and other hard surfaces. Ware also refers to items made of various substrates, including glass, ceramic, china, crystal, metal, plastic or natural substances such, but not limited to clay, bamboo, hemp and the like. Types of plastics that can be cleaned with the compositions according to the invention include but are not limited to, those that include polypropylene (PP), high density polyethylene (HDPE), low density polyethylene (LDPE), polyvinyl chloride (PVC), syrene acrylonitrile (SAN), polycarbonate (PC), melamine formaldehyde resins or melamine resin (melamine), acrilonitrile-butadiene-styrene (ABS), and polysulfone (PS). Other exemplary plastics that can be cleaned using the detergent compositions disclosed herein include polyethylene terephthalate (PET) polystyrene polyamide. As used herein, the term "warewashing" refers to washing, cleaning, or rinsing ware.

As used herein, the term "soil" refers to polar or non-polar organic or inorganic substances including, but not limited to carbohydrates, proteins, fats, oils and the like. These substances may be present in their organic state or complexed to a metal to form an inorganic complex.

As used herein, the term "stain" refers to a polar or non-polar substance which may or may not contain particulate matter such as metal oxides, metal hydroxides, metal oxide-hydroxides, clays, sand, dust, natural matter, carbon black, graphite and the like The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions of the present invention may comprise, consist essentially of, or consist of the components and ingredients of the present invention as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

Compositions

The present disclosure relates to detergent compositions with a pH sensitive color changing indicator dye. The disclosure also describes methods of making and using the color changing detergent compositions. Exemplary ranges of the detergent compositions are shown in Tables 1A-1C in weight percentage of the detergent compositions.

TABLE 1A

| Material | First Exemplary Range wt-% | Second Exemplary Range wt-% | Third Exemplary Range wt-% |
|---|---|---|---|
| Alkalinity source | 0.001-95 | 0.01-90 | 0.015-90 |
| pH sensitive dye | 0.001-15 | 0.005-10 | 0.01-5 |
| Additional functional ingredients | 0-35 | 0-25 | 0-15 |

TABLE 1B

| Material | First Exemplary Range wt-% | Second Exemplary Range wt-% | Third Exemplary Range wt-% |
|---|---|---|---|
| Alkalinity source | 0.005-95 | 0.01-90 | 0.015-85 |
| pH sensitive dye | 0.001-15 | 0.005-10 | 0.01-5 |
| Surfactant (cleaning and/or defoaming) | 0.001-30 | 0.005-30 | 0.01-15 |
| Additional functional ingredients | 0-35 | 0-25 | 0-15 |

TABLE 1C

| Material | First Exemplary Range wt-% | Second Exemplary Range wt-% | Third Exemplary Range wt-% |
|---|---|---|---|
| Alkalinity source | 0.01-99 | 0.01-90 | 0.01-80 |
| pH sensitive dye | 0.001-15 | 0.01-10 | 0.01-5 |
| Surfactant (cleaning and/or defoaming) | 0-35 | 0.01-15 | 0.01-10 |
| Water conditioning polymer | 0-20 | 0.005-15 | 0.01-10 |
| Additional functional ingredients | 0-25 | 0.001-15 | 0.01-10 |

The detergent compositions may include concentrate solids and/or liquid compositions or may be diluted to form use compositions, as well as ready-to-use compositions. In general, a concentrate refers to a composition that is intended to be diluted with water to provide a use solution that contacts an object to provide the desired cleaning, rinsing, or the like. The cleaning composition that contacts the articles or wares to be washed can be referred to as a concentrate or a use composition (or use solution) dependent upon the formulation employed in methods. It should be understood that the concentration of the pH sensitive dye and other components will vary depending on whether the cleaning composition is provided as a concentrate or as a use solution.

A use solution may be prepared from the concentrate by diluting the concentrate with water at a dilution ratio that provides a use solution having desired detersive properties. The water that is used to dilute the concentrate to form the use composition can be referred to as water of dilution or a diluent, and can vary from one location to another. The typical dilution factor is between approximately 1 and approximately 10,000 but will depend on factors including water hardness, the amount of soil to be removed and the like. In an embodiment, the concentrate is diluted at a ratio of between about 1:10 and about 1:10,000 concentrate to water. Particularly, the concentrate is diluted at a ratio of between about 1:100 and about 1:5,000 concentrate to water. More particularly, the concentrate is diluted at a ratio of between about 1:250 and about 1:2,000 concentrate to water.

In an aspect, a use solution of the cleaning composition has between about 1 ppm to about 1000 ppm alkalinity and between about 1 ppm to about 500 ppm pH sensitive dye. In a preferred aspect, a use solution of the cleaning composition has between about 100 ppm to about 2000 ppm alkalinity and between about 1 ppm to about 500 ppm pH sensitive dye. In a preferred aspect, a use solution of the cleaning composition has between about 100 ppm to about 1500 ppm alkalinity and between about 1 ppm to about 250 ppm pH sensitive dye. In a preferred aspect, a use solution of the cleaning composition has between about 2000 ppm to about 1250 ppm alkalinity and between about 5 ppm to about 200 ppm pH sensitive dye. In addition, without being limited according to the invention, all ranges recited are inclusive of the numbers defining the range and include each integer within the defined range.

The detergent compositions disclosed herein may be solid concentrate compositions. A "solid" composition refers to a composition in the form of a solid such as a powder, a particle, agglomerate, a flake, a granule, a pellet, a tablet, a lozenge, a puck, a briquette, a brick, a solid block, a unit dose, or another solid form known to those of skill in the art. The term "solid" refers to the state of the detergent composition under the expected conditions of storage and use of the solid detergent composition. In general, it is expected that the detergent composition will remain in solid form when exposed to elevated temperatures of 100° F., 112° F., and preferably 120° F. A cast, pressed, or extruded "solid" may take any form including a block. When referring to a cast, pressed, or extruded solid it is meant that the hardened composition will not flow perceptibly and will substantially retain its shape under moderate stress, pressure, or mere gravity. For example, the shape of a mold when removed from the mold, the shape of an article as formed upon extrusion from an extruder, and the like. The degree of hardness of the solid cast composition can range from that of a fused solid block, which is relatively dense and hard similar to concrete, to a consistency characterized as being malleable and sponge-like, similar to caulking material.

The detergent compositions disclosed herein can be made available as concentrates that are diluted (or as multiple concentrates that are diluted and combined) prior to or at the point of use to provide a use solution for applications on a variety of surfaces, namely hard surfaces. An advantage of providing concentrates that are later combined or diluted is that shipping and storage costs can be reduced because it can be less expensive to ship and store a concentrate rather than a use solution and is also more sustainable because less packaging is used.

The phrase "detergent composition" refers to the detergent composition provided as a concentrate or as a use composition according to the invention, which may be provided in a variety of formulations, including for example liquid, solid, powder, paste or gel. The term "concentrate" refers to a relatively concentrated form of the detergent composition that can be diluted with a diluent to form a use composition. An exemplary diluent that can be used to dilute the concentrate to form the use composition is water. In general, the use composition refers to the composition that contacts an article to provide a desired action. For example, a warewashing detergent composition that is provided as a use composition can contact ware for cleaning the ware. In addition, the concentrate or the diluted concentrate can be provided as the use composition. For example, the concentrate can be referred to as the use composition when it is applied to an article without dilution. In many situations, it is expected that the concentrate will be diluted to provide a use composition that is then applied to an article. In some preferred aspects, the dilution ratio of the alkaline detergent composition is from about 1:500 to about 1:5000 in water.

pH Indicators (pH Sensitive Dye)

Examples of pH indicators are litmus, bromthymol blue, methyl orange, thymol blue, bromocresol green, alizarin yellow, thymolphthalein, cyanidin, phenolphthalein, etc. By choosing an appropriate indicator, the color can vary depending on the pH value of the cleaning agent use composition as it is repeatedly used.

In a preferred embodiment the pH indicator is one that changes as the solution approaches a pH of greater than about 10. In a preferred embodiment, the pH indicator is an azo dye.

Azo dyes are widely used to treat textiles, leather articles, and some foods. Azo compounds are chemical compounds with the general formula R—N═N—R', where R and R' can be either aryl (aromatic) or alkyl (aliphatic) functional groups. The N═N group is called an azo group, although the parent compound, HNNH, is called diimide. The more stable azo compounds contain two aryl groups. Aryl azo compounds have vivid colors, especially reds, oranges, and yellows. Some azo compounds, such as methyl orange and methyl red, are used as acid-base indicators because their acid and salt forms have different colors. Methyl red is red at pH below 4.4, yellow at pH over 6.2, and orange in between.

Examples of pH indicators are listed in the Table below.

| Indicator | Low pH color | Transition low end | Transition high end | High pH color |
|---|---|---|---|---|
| Gentian violet (Methyl violet 10B) | yellow | 0.0 | 2.0 | blue-violet |
| Malachite green (first transition) | yellow | 0.0 | 2.0 | green |
| Malachite green (second transition) | green | 11.6 | 14.0 | colorless |
| Thymol blue (first transition) | red | 1.2 | 2.8 | yellow |
| Thymol blue (second transition) | yellow | 8.0 | 9.6 | blue |
| Methyl yellow | red | 2.9 | 4.0 | yellow |
| Bromophenol blue | yellow | 3.0 | 4.6 | blue |
| Congo red | blue-violet | 3.0 | 5.0 | red |
| Methyl orange | red | 3.1 | 4.4 | yellow |
| Screened methyl orange (first transition) | red | 0.0 | 3.2 | purple-grey |
| Screened methyl orange (second transition) | purple-grey | 3.2 | 4.2 | green |
| Bromocresol green | yellow | 3.8 | 5.4 | blue |
| Methyl red | red | 4.4 | 6.2 | yellow |
| Methyl purple | purple | 4.8 | 5.4 | green |
| Azolitmin | red | 4.5 | 8.3 | blue |
| Bromocresol purple | yellow | 5.2 | 6.8 | purple |
| Bromothymol blue (first transition) | magenta | <0 | 6.0 | yellow |
| Bromothymol blue (second transition) | yellow | 6.0 | 7.6 | blue |
| Phenol red | yellow | 6.4 | 8.0 | red |
| Neutral red | red | 6.8 | 8.0 | yellow |
| Naphtholphthalein | pale red | 7.3 | 8.7 | greenish-blue |
| Cresol red | yellow | 7.2 | 8.8 | reddish-purple |
| Cresolphthalein | colorless | 8.2 | 9.8 | purple |
| Phenolphthalein (first transition) | orange-red | <0 | 8.3 | colorless |
| Phenolphthalein (second transition) | colorless | 8.3 | 10.0 | purple-pink |
| Phenolphthalein (third transition) | fuchsia | 12.0 | 13.0 | colorless |
| Thymolphthalein (first transition) | red | <0 | 9.3 | colorless |
| Thymolphthalein (second transition) | colorless | 9.3 | 10.5 | blue |
| Alizarine Yellow R | yellow | 10.2 | 12.0 | red |
| Indigo carmine | blue | 11.4 | 13.0 | yellow |

The pH indicator may be selected based upon the desired pH target as appropriate. For example, pH indicators with a color change at pH of 10 or greater include Phenolphthalein (second transition), Malachite green (second transition), Phenolphthalein (third transition), Thymolphthalein (first transition), Thymolphthalein (second transition), Alizarine Yellow R, and Indigo carmine. In a preferred embodiment the pH indicator is Alizarin Yellow R, having the formula below:

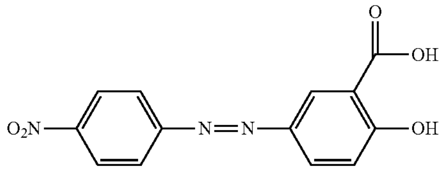 [SMILES: O=C(O)c1cc(N=Nc2ccc([N+](=O)[O-])cc2)ccc1O]

The pH sensitive dye is generally present is the concentrate from about 0.001 wt. % to about 15 wt. %, Preferably from about 0.005 wt. % to about 10 wt. % and more preferably from about 0.01 wt. % to about 5 wt. %.

Alkalinity Source

According to an embodiment, the detergent compositions include an alkalinity source. Exemplary alkalinity sources include alkali metal carbonates and/or alkali metal hydroxides. In various aspects, a combination of both alkali metal carbonates and/or alkali metal hydroxides are employed as the alkalinity source.

Alkali metal carbonates used in the formulation of detergents are often referred to as ash-based detergents and most often employ sodium carbonate. Additional alkali metal carbonates include, for example, sodium or potassium carbonate. In another embodiments, the alkali metal carbonates and alkali metal hydroxides are further understood to include bicarbonates and sesquicarbonates. According to the detergent compositions disclosed herein, any “ash-based” or “alkali metal carbonate” shall also be understood to include all alkali metal carbonates, bicarbonates and/or sesquicarbonates.

Alkali metal hydroxides used in the formulation of detergents are often referred to as caustic detergents. Examples of suitable alkali metal hydroxides include sodium hydroxide, potassium hydroxide, and lithium hydroxide. Exemplary alkali metal salts include sodium carbonate, potassium carbonate, and mixtures thereof. The alkali metal hydroxides may be added to the composition in any form known in the art, including as solid beads, dissolved in an aqueous solution, or a combination thereof. Alkali metal hydroxides are commercially available as a solid in the form of prilled solids or beads having a mix of particle sizes ranging from about 12-100 U.S. mesh, or as an aqueous solution, as for example, as a 45% and a 50% by weight solution.

In addition to the first alkalinity source, the detergent composition may comprise a secondary alkalinity source. Examples of useful secondary alkaline sources include, but are not limited to: alkali metal silicates such as sodium or potassium silicate or metasilicate; alkali metal carbonates such as sodium or potassium carbonate, bicarbonate, sesquicarbonate; alkali metal borates such as sodium or potassium borate; and ethanolamines and amines. Such alkalinity agents are commonly available in either aqueous or powdered form, either of which is useful in formulating the present detergent compositions.

An effective amount of one or more alkalinity sources is provided in the detergent composition. An effective amount is referred to herein as an amount that provides a use composition having a pH of at least about 9, preferably at least about 10. When the use composition has a pH of between about 9 and about 10, it can be considered mildly alkaline, and when the pH is greater than about 12, the use composition can be considered caustic. The use solution pH range is preferably between about 8.0 and about 13.0, and more preferably between about 10 to 12.

In an embodiment, the claimed detergent compositions include from about 20 wt-% to about 80 wt-% of the alkalinity source, from about 30 wt-% to about 80 wt-% of the alkalinity source, from about 40 wt-% to about 80 wt-% of the alkalinity source, and preferably from about 50 wt-% to about 80 wt-% of the alkalinity source. In addition, without being limited according to the detergent compositions disclosed herein, all ranges recited are inclusive of the numbers defining the range and include each integer within the defined range.

pH Sensitive Dye

The detergent compositions disclosed herein include a pH sensitive indicator dye. In a preferred embodiment, the pH sensitive dye exhibits a color change between a pH of about 8 and about 12, more preferably between about 9 and about 11, or most preferably at a pH between about 9 and about 10.5. In some embodiments, the pH sensitive dye exhibits a color change between a pH of about 10 and about 10.5.

In some embodiments, the pH sensitive dye comprises an azo dye. Azo dyes are organic compounds comprising one or more diazenyl functional groups:

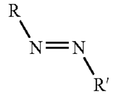

wherein R and R' are either an aryl group or an alkyl group. Preferred azo dyes include those where R has between 2 and 20 carbons, more preferably between 4 and 16 carbons, and where R' has between 2 and 20 carbons, more preferably between 4 and 16 carbons. For a more detailed description of suitable azo dyes, see U.S. Pat. No. 4,029,598 at column 2, line 7 through column 5, line 68, which is incorporated herein by reference in its entirety.

In an exemplary embodiment, the pH sensitive dye is alazirin yellow R:

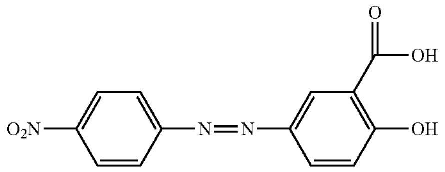

In an embodiment, the detergent compositions disclosed herein include from about 0.01 wt-% to about 15 wt-% of the pH sensitive dye, preferably from about 0.1 wt-% to about 10 wt-% of the pH sensitive dye, more preferably from about 0.1 wt-% to about 5 wt-% of the pH sensitive dye. In addition, without being limited according to the detergent compositions disclosed herein, all ranges recited are inclusive of the numbers defining the range and include each integer within the defined range.

In an embodiment, a use solution of the alkaline detergent compositions provides pH sensitive dye of at least about 1 ppm, at least about 5 ppm, preferably at least about 10 ppm. The use solution can include between about 1 ppm and about 500 ppm of the pH sensitive dye, preferably between about 1 ppm and about 250 ppm of the pH sensitive dye, more preferably between about 5 ppm and about 200 ppm of the pH sensitive dye, most preferably between about 10 ppm and about 100 ppm of the pH sensitive dye. In addition, without being limited according to the invention, all ranges for the ratios recited are inclusive of the numbers defining the range and include each integer within the defined range of ratios.

Additional Functional Ingredients

The components of the claimed detergent compositions can further be combined with various functional components suitable for use in ware wash and other applications employing an alkaline detergent or cleaning composition. In some embodiments, the claimed detergent compositions including alkalinity source and the pH sensitive dye make up a large amount, or even substantially all of the total weight of the detergent compositions. For example, in some embodiments few or no additional functional ingredients are disposed therein.

In other embodiments, additional functional ingredients may be included in the claimed detergent compositions. The functional ingredients provide desired properties and functionalities to the compositions. For the purpose of this application, the term "functional ingredient" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in cleaning, specifically ware wash applications. However, other embodiments may include functional ingredients for use in other applications.

Defoaming Agents

In an embodiment, the detergent compositions disclosed herein may optionally include a defoaming agent. In an embodiment, the detergent compositions disclosed herein include a defoaming agent. In a preferred embodiment, the defoaming agent is a nonionic surfactant. In a preferred embodiment, the defoaming agent is a nonionic alkoxylated surfactant. In another preferred embodiment, the defoaming agent is a nonionic surfactant having a formula RO—(PO)$_{0-5}$(EO)$_{1-30}$ (PO)$_{1-30}$, or RO—(PO)$_{1-30}$(EO)$_{1-30}$ (PO)$_{1-30}$, wherein R is a $C_{8-18}$ linear or branched alkyl group; EO=ethylene oxide; PO=propylene oxide. Exemplary suitable alkoxylated surfactants include ethylene oxide/propylene block copolymers (EO/PO copolymers), such as those available under the name Pluronic or Plurafac®, capped EO/PO copolymers, partially capped EO/PO copolymers, fully capped EO/PO copolymers, alcohol alkoxylates, capped alcohol alkoxylates, mixtures thereof, or the like.

Other defoaming agents can include silicone compounds such as silica dispersed in polydimethylsiloxane, polydimethylsiloxane, and functionalized polydimethylsiloxane such as those available under the name Abil B9952, fatty amides, hydrocarbon waxes, fatty acids, fatty esters, fatty alcohols, fatty acid soaps, ethoxylates, mineral oils, polyethylene glycol esters, alkyl phosphate esters such as monostearyl phosphate, and the like. A discussion of defoaming agents may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated by reference herein for all purposes.

Nonionic surfactants generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties. According to the invention, the nonionic surfactant useful in the composition is a low-foaming nonionic surfactant. Examples of nonionic low foaming surfactants useful in the present invention include:

1. Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available under the trade names Pluronic® and Tetronico manufactured by BASF Corp. Pluronic® compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from 1,000 to 4,000. Ethylene oxide is then added to sandwich this hydrophobe between hydrophilic groups, controlled by length to constitute from about 10% by weight to about 80% by weight of the final molecule. Tetronic® compounds are tetra-functional block copolymers derived from the sequential addition of propylene oxide and ethylene oxide to ethylenediamine. The molecular weight of the propylene oxide hydrotype ranges from 500 to 7,000; and, the hydrophile, ethylene oxide, is added to constitute from 10% by weight to 80% by weight of the molecule.

2. Condensation products of one mole of alkyl phenol wherein the alkyl chain, of straight chain or branched chain configuration, or of single or dual alkyl constituent, contains from 8 to 18 carbon atoms with from 3 to 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhone-Poulenc and Triton® manufactured by Dow.

3. Condensation products of one mole of a saturated or unsaturated, straight or branched chain alcohol having from 6 to 24 carbon atoms with from 3 to 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Neodol® manufactured by Shell Chemical Co. and Alfonic® manufactured by Vista Chemical Co.

4. Condensation products of one mole of saturated or unsaturated, straight or branched chain carboxylic acid having from 8 to 18 carbon atoms with from 6 to 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade names Nopalcol® manufactured by Henkel Corporation and Lipopeg® manufactured by Lipo Chemicals, Inc.

5. Compounds with the following structure: RO—(PO)$_{0-5}$(EO)$_{1-30}$ (PO)$_{1-30}$, wherein R is a C8-18 linear or branched alkyl group; EO=ethylene oxide; PO=propylene oxide.

6. Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from 1,000 to 3,100 with the central hydrophile including 10% by weight to 80% by weight of the final molecule. These reverse Pluronics® are manufactured by BASF Corporation under the trade name Pluronic® R surfactants.

7. Alkoxylated diamines produced by the sequential addition of propylene oxide and ethylene oxide to ethylenediamine. The hydrophobic portion of the molecule weighs from 250 to 6,700 with the central hydrophile including 0.1% by weight to 50% by weight of the final molecule. Examples of commercial compounds of this chemistry are available from BASF Corporation under the tradename Tetronic™ Surfactants.

8. Alkoxylated diamines produced by the sequential addition of ethylene oxide and propylene oxide to ethylenediamine. The hydrophobic portion of the molecule weighs from 250 to 6,700 with the central hydrophile including 0.1% by weight to 50% by weight of the final molecule. Examples of commercial compounds of this chemistry are available from BASF Corporation under the tradename Tetronic R™ Surfactants.

9. Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

10. Polyoxyalkylene surface-active agents which are advantageously used in the compositions of this invention correspond to the formula: $P[(C_3H_6O)_n(C_2H_4O)_mH]_x$ wherein P is the residue of an organic compound having from 8 to 18 carbon atoms and containing x reactive hydrogen atoms in which x has a value of 1 or 2, n has a value such that the molecular weight of the polyoxyethylene portion is at least 44 and m has a value such that the oxypropylene content of the molecule is from 10% to 90% by weight. In either case the oxypropylene chains may contain optionally, but advantageously, small amounts of ethylene oxide and the oxyethylene chains may contain also optionally, but advantageously, small amounts of propylene oxide.

11. Alkoxylated amines or, most particularly, alcohol alkoxylated/aminated/alkoxylated surfactants. These nonionic surfactants may be at least in part represented by the general formulae:

$R^{20}$—$(PO)_sN$-$(EO)_tH$, $R_20$-$(PO)_sN$-$(EO)_tH(EO)_tH$, and $R^{20}$—$N(EO)_t H$;

in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula:

$R^{20}$—$(PO)_v$—$N[(EO)_wH][(EO)_zH]$ in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. A preferred chemical of this class includes Surfonic PEA 25 Amine Alkoxylate.

In an embodiment, the claimed detergent compositions include from about 0.5 wt-% to about 15 wt-% of the defoaming agent, from about 0.5 wt-% to about 10 wt-% of the defoaming agent, from about 0.5 wt-% to about 5 wt-% of the defoaming agent, and preferably from about 0.5 wt-% to about 3 wt-%, about 1 wt-%, about 3 wt-%, about 5 wt-%, or about 10 wt-% of the defoaming agent. In addition, without being limited according to the detergent compositions disclosed herein, all ranges recited are inclusive of the numbers defining the range and include each integer within the defined range.

Surfactants

In some embodiments, the detergent composition disclosed herein include a surfactant. In some other embodiments, the detergent compositions disclosed herein include a nonionic defoaming surfactant or agent. In some other embodiments, the detergent compositions disclosed herein include an additional surfactant together with a nonionic defoaming surfactant or agent. Surfactants suitable for use with the detergent compositions disclosed herein include, but are not limited to, additional nonionic surfactants, anionic surfactants, cationic surfactants and zwitterionic surfactants. In yet some other embodiments, the detergent compositions disclosed herein is free of any additional surfactant other than one or more nonionic defoaming surfactants or agents.

In some embodiments, the detergent compositions disclosed herein include, in addition to the nonionic defoaming surfactant or agent, about 0 wt-% to about 50 wt-% of an additional surfactant, from about 0 wt-% to about 25 wt-%, from about 0 wt-% to about 15 wt-%, from about 0 wt-% to about 10 wt-%, or from about 0 wt-% to about 5 wt-%, about 0 wt-%, about 0.5 wt-%, about 1 wt-%, about 3 wt-%, about 5 wt-%, about 10 wt-%, or about 15 wt-% of an additional surfactant.

Anionic Surfactants

Also useful in the detergent compositions disclosed herein are surface active substances which are categorized as anionic surfactants because the charge on the hydrophobic group is negative; or surfactants in which the hydrophobic section of the molecule carries no charge unless the pH is elevated to neutrality or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility. As those skilled in the art understand, anionic surfactants are excellent detersive surfactants and are therefore favored additions to heavy duty detergent compositions.

Anionic sulfate surfactants suitable for use in the claimed detergent compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule).

Anionic sulfonate surfactants suitable for use in the claimed detergent compositions also include alkyl sulfonates, the linear and branched primary and secondary alkyl sulfonates, and the aromatic sulfonates with or without substituents.

Anionic carboxylate surfactants suitable for use in the claimed detergent compositions include carboxylic acids (and salts), such as alkanoic acids (and alkanoates), ester carboxylic acids (e.g. alkyl succinates), ether carboxylic acids, sulfonated fatty acids, such as sulfonated oleic acid, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula:

$$R—O—(CH_2CH_2O)_n(CH_2)_m—CO_2X \quad (3)$$

in which R is a $C_8$ to $C_{22}$ alkyl group or

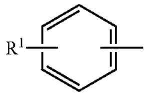, in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_8$-$C_{16}$ alkyl group. In some embodiments, R is a $C_{12}$-$C_{14}$ alkyl group, n is 4, and m is 1.

In other embodiments, R is

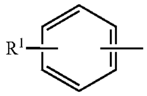

and $R^1$ is a $C_6$-$C_{12}$ alkyl group. In still yet other embodiments, $R^1$ is a C9 alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include, Neodox 23-4, a C12-13 alkyl polyethoxy (4) carboxylic acid (Shell Chemical), and Emcol CNP-110, a $C_9$ alkylaryl polyethoxy (10) carboxylic acid (Witco Chemical). Carboxylates are also available from Clariant, e.g. the product Sandopan® DTC, a $C_{13}$ alkyl polyethoxy (7) carboxylic acid.

Cationic Surfactants

Cationic Quaternary Surfactant/Quaternary Alkyl Amine Alkoxylate

The cationic quaternary surfactants are substances based on nitrogen centered cationic moieties with net positive change. Suitable cationic surfactants contain quaternary ammonium groups. Suitable cationic surfactants especially include those of the general formula: $N^{(+)}R^1R^2R^3R^4X^{(-)}$, wherein $R^1$, $R^2$, $R^3$ and $R^4$ independently of each other represent alkyl groups, aliphatic groups, aromatic groups, alkoxy groups, polyoxyalkylene groups, alkylamido groups, hydroxyalkyl groups, aryl groups, $H^+$ ions, each with from 1 to 22 carbon atoms, with the provision that at least one of the groups $R^1$, $R^2$, $R^3$ and $R^4$ has at least eight carbon atoms and wherein X(−) represents an anion, for example, a halogen, acetate, phosphate, nitrate or alkyl sulfate, preferably a chloride. The aliphatic groups can also contain cross-linking or other groups, for example additional amino groups, in addition to the carbon and hydrogen atoms.

Particular cationic active ingredients include, for example, but are not limited to, alkyl dimethyl benzyl ammonium chloride (ADBAC), alkyl dimethyl ethylbenzyl ammonium chloride, dialkyl dimethyl ammonium chloride, benzethonium chloride, N, N-bis-(3-aminopropyl) dodecylamine, chlorhexidine gluconate, an organic and/or organic salt of chlorhexidene gluconate, PHMB (polyhexamethylene biguanide), salt of a biguanide, a substituted biguanide derivative, an organic salt of a quaternary ammonium containing compound or an inorganic salt of a quaternary ammonium containing compound or mixtures thereof.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The simplest cationic amines, amine salts and quaternary ammonium compounds can be schematically drawn thus:

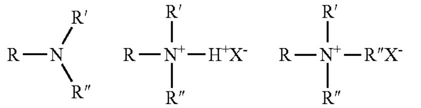

in which, R represents a long alkyl chain, R', R", and R''' may be either long alkyl chains or smaller alkyl or aryl groups or hydrogen and X represents an anion. The amine salts and quaternary ammonium compounds are preferred for practical use in this invention due to their high degree of water solubility.

Preferred cationic quaternary ammonium compound can be schematically shown as:

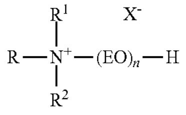

in which R represents a C8-C18 alkyl or alkenyl; $R^1$ and $R^2$ are C1-C4 alkyl groups; n is 10-25; and x is an anion selected from a halide or methyl sulfate.

The majority of large volume commercial cationic surfactants can be subdivided into four major classes and additional sub-groups known to those of skill in the art and described in "Surfactant Encyclopedia," Cosmetics & Toiletries, Vol. 104 (2) 86-96 (1989). The first class includes alkylamines and their salts. The second class includes alkyl imidazolines. The third class includes ethoxylated amines.

The fourth class includes quaternaries, such as alkylbenzyldimethylammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like.

Cationic surfactants useful in the claimed detergent compositions herein include those having the formula $R^1_mR^2_xYLZ$ wherein each $R^1$ is an organic group containing a straight or branched alkyl or alkenyl group optionally substituted with up to three phenyl or hydroxy groups and optionally interrupted by up to four of the following structures:

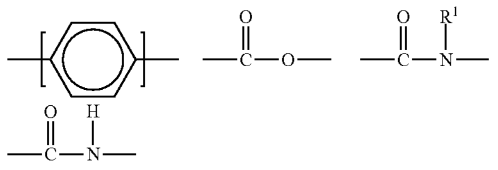

or an isomer or mixture of these structures, and which contains from 8 to 22 carbon atoms. The $R^1$ groups can additionally contain up to 12 ethoxy groups. m is a number from 1 to 3. Preferably, no more than one $R^1$ group in a molecule has 16 or more carbon atoms when m is 2, or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group is filled by hydrogens.

Y can be a group including, but not limited to:

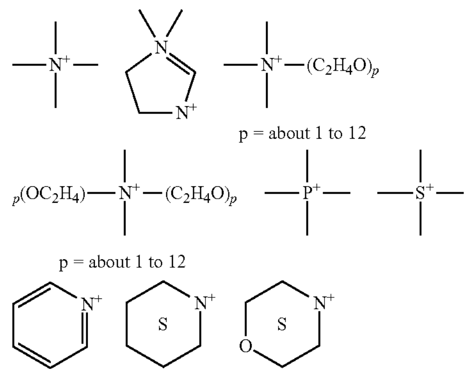

or a mixture thereof.

Preferably, L is 1 or 2, with the Y groups being separated by a moiety selected from $R^1$ and $R^2$ analogs (preferably alkylene or alkenylene) having from 1 to 22 carbon atoms and two free carbon single bonds when L is 2. Z is a water soluble anion, such as sulfate, methylsulfate, hydroxide, or nitrate anion, particularly preferred being sulfate or methyl sulfate anions, in a number to give electrical neutrality of the cationic component.

Suitable concentrations of the cationic quaternary surfactant in the claimed detergents compositions may be between about 0% and about 10% by weight of the claimed detergent compositions.

Amphoteric Surfactants

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" Cosmetics & Toiletries, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present invention generally have the general formula:

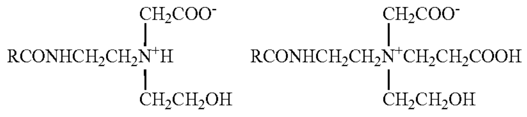

(MONO)ACETATE (DI)PROPIONATE

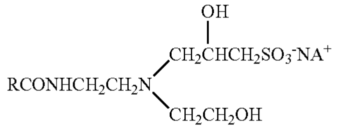

Neutral pH Zwitterion
AMPHOTERIC SULFONATE wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which $R=C_8$-$C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this invention include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—$N^+$($CH_2$—$CH_2$—$CO_2Na)_2$—$CH_2$—$CH_2$—OH or $C_{12}$-alkyl-C(O)—N(H)—$CH_2$—$CH_2$—$N^+$($CH_2$—$CO_2Na)_2$—$CH_2$—$CH_2$—OH. Disodium cocoampho dipropionate is one suitable amphoteric surfactant and is commercially available under the tradename Miranol™ FBS from Rhodia Inc., Cranbury, N.J. Another suitable coconut derived amphoteric surfactant with the chemical name disodium cocoampho diacetate is sold under the tradename Mirataine™ JCHA, also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated by reference in their entirety.

Zwitterionic Surfactants

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong"inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Betaine and sultaine surfactants are exemplary zwitterionic surfactants for use herein. A general formula for these compounds is:

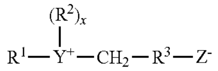

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

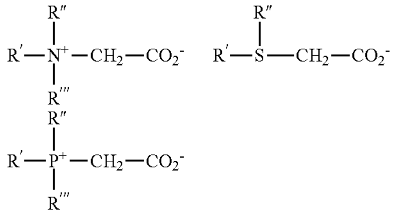

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present invention include those compounds having the formula $(R(R^1)_2N^+R^2SO^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated in their entirety.

Water Conditioning Polymers

In an embodiment, the claimed detergent compositions include one or more water conditioning polymers. Water conditioning polymers may include, but are not limited to: polycarboxylates. Exemplary polycarboxylates that can be used as builders and/or water conditioning polymers include, but are not limited to: those having pendant carboxylate (—CO2-) groups such as polyacrylic acid homopolymers, polymaleic acid homopolymers, maleic/olefin copolymers, sulfonated copolymers or terpolymers, acrylic/maleic copolymers or terpolymers polymethacrylic acid homopolymers, polymethacrylic acid copolymers or terpolymers, acrylic acid-methacrylic acid copolymers, hydrolyzed polyacrylamides, hydrolyzed polymethacrylamides, hydrolyzed polyamide-methacrylamide copolymers, hydrolyzed polyacrylonitriles, hydrolyzed polymethacrylonitriles, hydrolyzed acrylonitrile-methacrylonitrile copolymers and combinations thereof. For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein. These materials may also be used at sub stoichiometric levels to function as crystal modifiers.

In an embodiment, the claimed detergent compositions include from about 0.1 wt-% to about 25 wt-% of the water conditioning polymer(s), from about 1 wt-% to about 20 wt-% of the water conditioning polymer(s), from about 1 wt-% to about 15 wt-% of the water conditioning polymer(s), and preferably from about 1 wt-% to about 10 wt-% of the water conditioning polymer(s). In addition, without being limited according to the detergent compositions disclosed herein, all ranges recited are inclusive of the numbers defining the range and include each integer within the defined range.

Aminocarboxylates

In an embodiment, the detergent compositions disclosed herein include an aminocarboxylate (or aminocarboxylic acid materials). Exemplary aminocarboxylates include, for example, N-hydroxyethylaminodiacetic acid, ethylenediaminetetraacetic acid (EDTA), methylglycinediacetic acid (MGDA), hydroxyethylenediaminetetraacetic acid, diethylenetriaminepentaacetic acid, N-hydroxyethyl-ethylenediaminetriacetic acid (HEDTA), glutamic acid N,N-diacetic acid (GLDA), diethylenetriaminepentaacetic acid (DTPA), Iminodisuccinic acid (IDS), ethylenediamine disuccinic acid (EDDS), 3-hydroxy-2,2-iminodisuccinic acid (HIDS), hydroxyethyliminodiacetic acid (HEIDA) and other similar acids having an amino group with a carboxylic acid substituent.

In an embodiment, the detergent compositions disclosed herein include from about 0.1 wt-% to about 25 wt-% of one or more aminocarboxylates, from about 1 wt-% to about 20 wt-% of one or more aminocarboxylates, from about 1 wt-% to about 15 wt-% of one or more aminocarboxylates, preferably from about 5 wt-% to about 15 wt-%, or from about 10 wt-% to about 20 wt-% of one or more aminocarboxylates. In addition, without being limited according to the detergent compositions disclosed herein, all ranges recited are inclusive of the numbers defining the range and include each integer within the defined range.

Phosphonates

In some embodiments, the claimed detergent compositions may include a phosphonate. Examples of phosphonates include, but are not limited to: phosphinosuccinic acid oligomer (PSO) described in U.S. Pat. Nos. 8,871,699 and 9,255,242; 2-phosphinobutane-1,2,4-tricarboxylic acid (PBTC), 1-hydroxyethane-1,1-diphosphonic acid, $CH_2C(OH)[PO(OH)_2]_2$; aminotri(methylenephosphonic acid), $N[CH_2PO(OH)_2]_3$; aminotri(methylenephosphonate), sodium salt (ATMP), $N[CH_2PO(ONa)_2]_3$; 2-hydroxyethyliminobis(methylenephosphonic acid), $HOCH_2CH_2N[CH_2PO(OH)_2]_2$; diethylenetriaminepenta(methylenephosphonic acid), $(HO)_2POCH_2N[CH_2CH_2N[CH_2PO(OH)_2]_2]_2$; diethylenetriaminepenta(methylenephosphonate), sodium salt (DTPMP), $C_9H_{(28-x)}N_3Na_xO_{15}P_5$ (x=7); hexamethylenediamine(tetramethylenephosphonate), potassium salt, $C_{10}H_{(28-x)}N_2K_xO_{12}P_4$(x:=6); bis(hexamethylene)triamine (pentamethylenephosphonic acid), $(HO_2)POCH_2N[(CH_2)_2N[CH_2PO(OH)_2]_2]_2$; monoethanolamine phosphonate (MEAP); diglycolamine phosphonate (DGAP) and phosphorus acid, $H_3PO_3$. Preferred phosphonates are PBTC, HEDP, ATMP and DTPMP. A neutralized or alkali phosphonate, or a combination of the phosphonate with an alkali source prior to being added into the mixture such that there is little or no heat or gas generated by a neutralization reaction when the phosphonate is added is preferred. In one embodiment, however, the claimed detergent composition is phosphorous-free.

Suitable amounts of the phosphonates included in the detergent compositions disclosed here are between about 0% and about 25% by weight of the detergent compositions, between about 0.1% and about 20%, between about 0% and about 15%, between about 0% and about 10%, between about 0% and about 5%, between about 0.5% and about 10%, between about 0.5% and about 5%, or between about 0.5% and about 15% by weight of the detergent compositions.

Anti-Redeposition Agents

The alkaline detergent composition can include an anti-redeposition agent for facilitating sustained suspension of soils in a cleaning solution and preventing the removed soils from being redeposited onto the substrate being cleaned. Examples of suitable anti-redeposition agents include, but are not limited to: polyacrylates, styrene maleic anhydride copolymers, cellulosic derivatives such as hydroxyethyl cellulose, hydroxypropyl cellulose and carboxymethyl cellulose. When the detergent compositions include an anti-redeposition agent, the anti-redeposition agent can be included in an amount of between approximately 0.5% and approximately 10% by weight, and between approximately 1% and approximately 5% by weight. All ranges recited are inclusive of the numbers defining the range and include each integer within the defined range.

Stabilizing Agents

The alkaline detergent composition may also include stabilizing agents. Examples of suitable stabilizing agents include, but are not limited to, primary aliphatic amines, betaines, borate, calcium ions, sodium citrate, citric acid, sodium formate, glycerine, maleonic acid, organic diacids, polyols, propylene glycol, and mixtures thereof. The concentrate need not include a stabilizing agent, but when the detergent compositions include a stabilizing agent, it can be included in an amount that provides the desired level of stability of the concentrate. Exemplary ranges of the stabilizing agent include up to approximately 20% by weight, between approximately 0.05% and approximately 15% by weight, and between approximately 0.1% and approximately 10% by weight. All ranges recited are inclusive of the numbers defining the range and include each integer within the defined range.

Methods of Use

The methods of use employing the alkaline detergent compositions are particularly suited for use in closed systems, e.g. dish or ware washing systems for cleaning, sanitizing and/or disinfecting articles and surfaces. According to an embodiment of the invention the alkaline detergent compositions are particularly well suited for industrial or institutional ware washing to clean treated surfaces.

The methods include contacting an article or surface with the alkaline detergent composition or a detergent use composition according to the invention to wash the surface. The methods can contact the liquid to any of a variety of surfaces or objects including surfaces or articles including those made of glass, ceramic, plastic, porcelain, aluminum, or the like.

Contacting can include any of numerous methods for applying a composition, such as spraying the composition, immersing the object in the composition, or a combination thereof. A concentrate or use concentration of a composition of the present invention can be applied to or brought into contact with an article by any conventional method or apparatus for applying a cleaning composition to an object. For example, the object can be wiped with, sprayed with, and/or immersed in the composition, or a use solution made from the composition. The composition can be sprayed, or wiped onto a surface; the composition can be caused to flow over the surface, or the surface can be dipped into the composition. Contacting can be manual or by machine.

Before contacting an article or surface, a concentrate detergent composition may be first diluted with water prior to or at the location of use to provide the use solution. In an aspect, the alkaline detergent use solution is formed by diluting the concentrated alkaline detergent composition with water from about 1:500 to about 1:5000. When the composition is used in an automatic warewashing or dishwashing machine, it is expected that that the location of use will be inside the automatic warewashing machine. Depending on the machine, the composition may be provided in a unit dose form or in a multi-use form. In larger warewashing machines, a large quantity of composition may be provided in a compartment that allows for the release of a single dose amount of the composition for each wash cycle. Such a compartment may be provided as part of the warewashing machine or as a separate structure connected to the warewashing machine.

The use solution is often re-used for multiple cycles. Once the color change occurs indicating that the alkalinity has decreased to a level where optimal cleaning is not achieved, pH less than 10, then the water and solution is discharged and replaced.

The methods of the invention may further employ one or more rinse steps for the treated articles or surfaces. In an aspect, the commercial use of the alkaline detergent compositions at high temperatures preferably include a rinse step employing a rinse aid, including for example, the disclosure of using rinse aids set forth in U.S. patent application Ser. No. 13/480,031, which is herein incorporated by reference in its entirety.

Methods of Manufacture

The detergent compositions disclosed herein can be formed by combining the components in the weight percentages and ratios disclosed herein. The detergent compositions disclosed herein can be provided as a solid and a use solution is formed during the warewashing processes (or other application of use).

Solid detergent compositions disclosed herein can be formed using the solidification matrix and are produced using a batch or continuous mixing system. In an exemplary embodiment, a single- or twin-screw extruder is used to combine and mix one or more agents at high shear to form a homogeneous mixture. In some embodiments, the processing temperature is at or below the melting temperature of the components. The processed mixture may be dispensed from the mixer by forming, casting or other suitable means, whereupon the detergent composition hardens to a solid form. The structure of the matrix may be characterized according to its hardness, melting point, material distribution, crystal structure, and other like properties according to known methods in the art. Generally, a solid detergent composition processed according to the method of the invention is substantially homogeneous with regard to the distribution of ingredients throughout its mass and is dimensionally stable.

Specifically, in a forming process, the liquid and solid components are introduced into the final mixing system and are continuously mixed until the components form a substantially homogeneous semi-solid mixture in which the components are distributed throughout its mass. In an exemplary embodiment, the components are mixed in the mixing system for at least approximately 5 seconds. The mixture is then discharged from the mixing system into, or through, a die or other shaping means. The product is then packaged. In an exemplary embodiment, the formed composition begins to harden to a solid form in between approximately 1 minute and approximately 3 hours. Particularly, the formed composition begins to harden to a solid form in between approximately 1 minute and approximately 2 hours. More particularly, the formed composition begins to harden to a solid form in between approximately 1 minute and approximately 20 minutes.

Pressing can employ low pressures compared to conventional pressures used to form tablets or other conventional solid compositions. For example, in an embodiment, the present method employs a pressure on the solid of only less than or equal to about 5000 psi. In certain embodiments, the present method employs pressures of less than or equal to about 3500 psi, less than or equal to about 2500 psi, less than or equal to about 2000 psi, or less than or equal to about 1000 psi. In certain embodiments, the present method can employ pressures of about 1 to about 1000 psi, about 2 to about 900 psi, about 5 psi to about 800 psi, or about 10 psi to about 700 psi.

Specifically, in a casting process, the liquid and solid components are introduced into the final mixing system and are continuously mixed until the components form a substantially homogeneous liquid mixture in which the components are distributed throughout its mass. In an exemplary embodiment, the components are mixed in the mixing system for at least approximately 60 seconds. Once the mixing is complete, the product is transferred to a packaging container where solidification takes place. In an exemplary embodiment, the cast composition begins to harden to a solid form in between approximately 1 minute and approximately 3 hours. Particularly, the cast composition begins to harden to a solid form in between approximately 1 minute and approximately 2 hours. More particularly, the cast composition begins to harden to a solid form in between approximately 1 minute and approximately 20 minutes.

By the term "solid form", it is meant that the hardened composition will not flow and will substantially retain its shape under moderate stress or pressure or mere gravity. The degree of hardness of the solid cast composition may range from that of a fused solid product which is relatively dense and hard, for example, like concrete, to a consistency characterized as being a hardened paste. In addition, the term "solid" refers to the state of the detergent composition under the expected conditions of storage and use of the solid detergent composition. In general, it is expected that the detergent composition will remain in solid form when exposed to temperatures of up to approximately 100° F. and particularly greater than approximately 120° F.

The resulting solid detergent composition may take forms including, but not limited to: a pressed solid; a cast solid product; an extruded, molded or formed solid pellet, block, tablet, powder, granule, flake; or the formed solid can thereafter be ground or formed into a powder, granule, or flake. In an exemplary embodiment, extruded pellet materials formed by the solidification matrix have a weight of between approximately 50 grams and approximately 250 grams, extruded solids formed by the solidification matrix have a weight of approximately 100 grams or greater, and solid block detergents formed by the solidification matrix have a mass of between approximately 1 and approximately 10 kilograms. The solid compositions provide for a stabilized source of functional materials. In some embodiments, the solid composition may be dissolved, for example, in an aqueous or other medium, to create a concentrated and/or use solution. The solution may be directed to a storage reservoir for later use and/or dilution, or may be applied directly to a point of use. Alternatively, the solid alkaline detergent composition is provided in the form of a unit dose, typically provided as a cast solid, an extruded pellet, or a tablet having a size of between approximately 1 gram and approximately 100 grams. In another alternative, multiple-use solids can be provided, such as a block or a plurality of pellets, and can be repeatedly used to generate aqueous detergent compositions for multiple cycles.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the detergent compositions disclosed herein are further defined in the following non-limiting Examples. It should be understood that these Examples, while indicating certain embodiments of the detergent compositions disclosed herein, are given by way of illustration only. From the above discussion and these Examples, one skilled in the art can ascertain the essential characteristics of the detergent compositions disclosed herein, and without departing from the spirit and scope thereof, can make various changes and modifications of the embodiments of the detergent compositions disclosed herein to adapt it to various usages and conditions. Thus, various modifications of the embodiments of the detergent compositions disclosed herein, in addition to those shown and described herein, will be apparent to those skilled in the art from the foregoing description. Such modifications are also intended to fall within the scope of the appended claims.

Example 1

Control: Commercially available alkaline warewash detergent from Ecolab

Test: Commercially available alkaline warewash detergent+ Alizarin Yellow R

Alazirin Yellow R - Red indicator

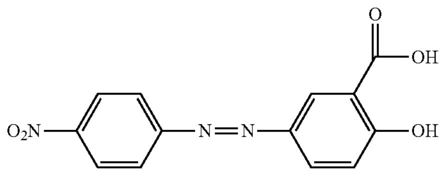

Apparatus and Materials

1. Institutional machine hooked up to the appropriate water supply
2. Sufficient detergent to complete the test
3. Hot Point ane Beef Stew Soils
4. Titrator and reagents to titrate alkalinity
5. Water hardness test kit Soil A 50/50 combination of beef stew and hot point soil was used at 4000 ppm. The soil consisted of the following ingredients:

1. 2 cans of Dinty Moore Beef Stew (1360 g)
2. 1 large can of tomato sauce (822 g)
3. 15.5 sticks of Blue Bonnet Margarine (1746. g)
4. Powdered milk (436.4 g)

Preparation

1. Fill the dishmachine with 5 GPG water. Test the water for hardness. Record the value. Turn on tank heaters.
2. Turn on the dishmachine and run wash/rinse cycles through the machine until a wash temperature of 150-160° F. and rinse temperature of 175-190° F. in reached.
3. Set controller to dispense 1500 ppm of commercial alkaline warewash detergent into the wash tank. Titrate to verify detergent concentration.
4. Add 187 ppm of hot point soil and 62 ppm salt (accounting for volume of sump).
5. Begin 45 cycle test. After each cycle, the appropriate amount of hot point soil and salt are added to the machine to maintain 187 ppm food soil and 62 ppm salt (sodium chloride).
6. At the beginning of each wash cycle, the appropriate amount of detergent is automatically dispensed into the warewash machine to maintain the initial detergent concentration. Detergent concentration is controlled by a conductivity probe.
7. Remove samples every 3 cycles to observe color change and measure pH.

Figure 2:
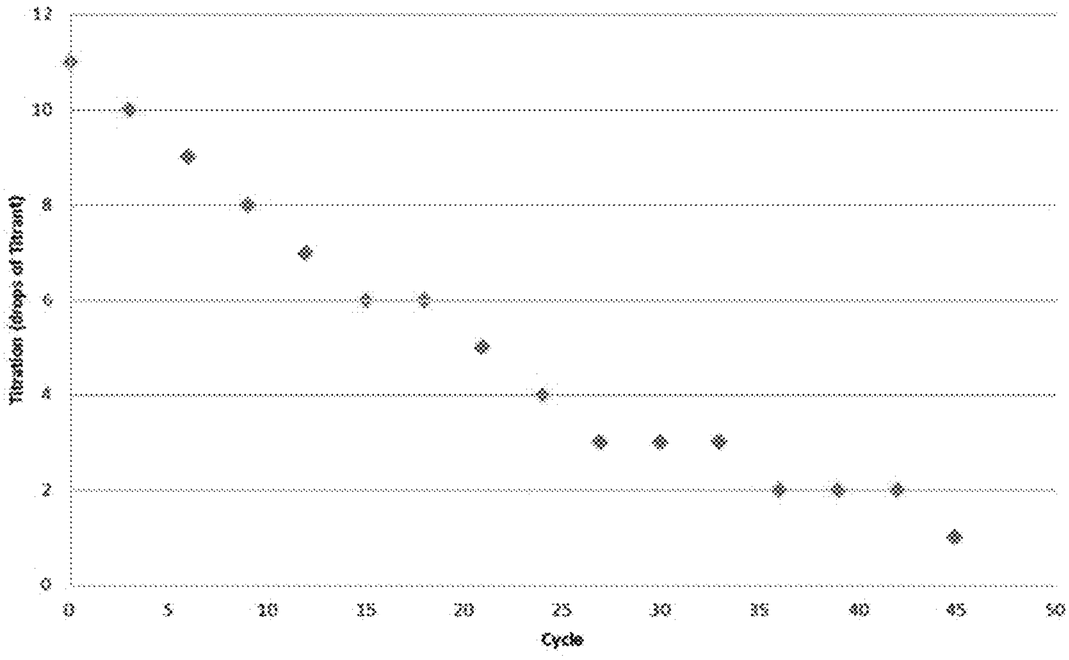
FIG. 2 is a graph of sump detergent titration values over 45 cycles maintaining 187 ppm hot point soil and 62 ppm of salt (sodium chloride).

Wash Conditions: 1500 ppm commercial alkaline warewash detergent, 50 ppm Alizarin Yellow R, 5 gpg water hardness, 187 ppm hotpoint soil and 62 ppm salt (sodium chloride), 70° C. wash temperature Results are shown in FIG. 1, FIG. 2, and Table 1. A red to yellow color change is observed between pH 10.7 (red)-10.1 or less (yellow). Table 1 shows the recorded pH values for cycles 3-45.

TABLE 1

| Sample# | Wash Cycle | pH |
|---|---|---|
| 1 | 3 | 10.72 |
| 2 | 6 | 10.51 |
| 3 | 9 | 10.55 |
| 4 | 12 | 10 46 |
| 5 | 15 | 10.38 |
| 6 | 18 | 10.31 |
| 7 | 21 | 10.23 |
| 8 | 24 | 10.14 |
| 9 | 27 | 10.07 |
| 10 | 30 | 9.99 |
| 11 | 33 | 9.92 |
| 12 | 36 | 9.85 |
| 13 | 39 | 9.78 |
| 14 | 42 | 9.7 |
| 15 | 45 | 9.65 |

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. A color changing alkaline detergent composition comprising:
- from about 20 wt. % to about 80 wt. % of an alkalinity source;
- from about 0.5 wt % to about 15 wt % of a defoaming agent comprising an alkoxylated nonionic surfactant;
- a pH sensitive dye; wherein the pH sensitive dye is an azo dye that exhibits a color change at a pH less than about 10.1;
- wherein a use solution of the composition has a pH of at least about 10; and
- wherein the composition is free of sulfate and sulfonate surfactants.

2. The composition of claim 1, wherein the alkalinity source comprises an alkali metal carbonate, alkali metal hydroxide, alkali metal metasilicate and/or alkali metal silicate.

3. The composition of claim 1, wherein the azo dye is Alizarin Yellow R.

4. The composition of claim 1, wherein the alkoxylated nonionic surfactant comprises an ethylene oxide/propylene block copolymer and an alcohol alkoxylate.

5. The composition of claim 1, further comprising a water conditioning polymer.

6. The composition of claim 5, wherein the water conditioning polymer comprises a polycarboxylic acid, a polyacrylate, and/or a polymethacrylate.

7. The composition of claim 1, wherein the composition further comprises at least one additional functional ingredient selected from an aminocarboxylate, a phosphonate, an anti-redeposition agent, and/or a stabilizing agent.

8. The composition of claim 1, wherein a use solution of the composition comprises from about 100 to about 2000 ppm of the alkalinity source and from about 1 to about 500 ppm of the pH sensitive dye.

9. A method of detecting the concentration of a cleaning composition, the method comprising:
- contacting a surface or article in need of cleaning with an alkaline detergent composition, wherein the composition comprises from about 20 wt. % to about 80 wt. % of an alkalinity source, from about 0.5 wt % to about 15 wt % of a defoaming agent comprising an alkoxylated nonionic surfactant, and a pH sensitive dye, wherein the pH sensitive dye is an azo dye that exhibits a color change at a pH of less than about 10.1, and wherein the composition is free of sulfate and sulfonate surfactants, and wherein a use solution of the composition has a pH of at least about 10; and
- determining whether the composition has a concentration efficacious for cleaning by observing whether the composition exhibits a color change.

10. The method of claim 9, wherein the use solution is generated within a warewashing machine.

11. The method of claim 9, wherein the pH sensitive dye is provided at a concentration from about 1 ppm to about 500 ppm in the use solution.

12. The method of claim 9, wherein the pH sensitive dye is Alizarin Yellow R.

13. The method of claim 9, wherein the color change is from a red color to a yellow color, wherein the red color indicates the concentration is efficacious for cleaning.

14. A method of cleaning ware comprising:
- generating a use solution by diluting an alkaline detergent composition, wherein the composition comprises from about 20 wt. % to about 80 wt. % of an alkalinity source, from about 0.5 wt % to about 15 wt % of a defoaming agent comprising an alkoxylated nonionic surfactant, and a pH sensitive dye and is free of sulfate and sulfonate surfactants, wherein the use solution has a pH of at least about 10;
- applying said solution to said are in a dish machine,
- monitoring the color of the use solution wherein the pH sensitive dye is an azo dye that exhibits a color change between at a pH of less than about 10.1; and
- thereafter, changing the use solution when the color change occurs.

15. The method of claim 14, wherein the use solution is generated within an industrial ware washing machine.

16. The method of claim 15, further comprising the step of draining the warewash machine when a color change is observed.

17. The method of claim 14, wherein the color change is from a red color to a yellow color, wherein the yellow color indicates the warewash machine needs to be drained and the use solution replaced.

* * * * *